US010057549B2

(12) United States Patent
Yu et al.

(10) Patent No.: US 10,057,549 B2
(45) Date of Patent: Aug. 21, 2018

(54) COMPUTER-IMPLEMENTED SYSTEM AND METHOD FOR COLOR SENSING, STORAGE AND COMPARISON

(71) Applicant: Variable, Inc., Chattanooga, TN (US)

(72) Inventors: George Yang Yu, Chattanooga, TN (US); Andrew Richard Temple, Chattanooga, TN (US); Wade Gasior, Chattanooga, TN (US)

(73) Assignee: Variable, Inc., Chattanooga, TN (US)

(*) Notice: Subject to any disclaimer, the term of this patent is extended or adjusted under 35 U.S.C. 154(b) by 77 days.

(21) Appl. No.: 14/702,236

(22) Filed: May 1, 2015

(65) Prior Publication Data
US 2015/0296189 A1 Oct. 15, 2015

Related U.S. Application Data

(63) Continuation of application No. PCT/US2013/068305, filed on Nov. 4, 2013.
(Continued)

(51) Int. Cl.
*H04N 5/228* (2006.01)
*H04N 9/73* (2006.01)
(Continued)

(52) U.S. Cl.
CPC ............... *H04N 9/07* (2013.01); *G01J 3/027* (2013.01); *G01J 3/0262* (2013.01);
(Continued)

(58) Field of Classification Search
CPC .. G01J 3/02; G01J 3/0272; G01J 3/501; G01J 3/0291; G01J 3/10; G01J 3/524;
(Continued)

(56) References Cited

U.S. PATENT DOCUMENTS

| 5,070,732 A | 12/1991 | Duncan et al. |
| 5,319,437 A * | 6/1994 | Van Aken ................. G01J 3/02 356/326 |

(Continued)

FOREIGN PATENT DOCUMENTS

| CN | 101055206 B | 10/2007 |
| CN | 102193628 A | 9/2011 |

(Continued)

OTHER PUBLICATIONS

Brian Heater, "Node Modular iOS Sensor Hands-On", Oct. 20, 2012, XP002763666, 6 pp., retrieved from the Internet on Oct. 31, 2016.
(Continued)

*Primary Examiner* — Chia-Wei A Chen
(74) *Attorney, Agent, or Firm* — Patterson Intellectual Property Law, P.C.; Gary L. Montle

(57) ABSTRACT

A modular device includes base and color sensing portions. The color sensing portion has a face, a controlled light source offset from the face to define an interior, the face configured to engage a target surface about a perimeter of the device housing wherein ambient light is restricted from entering the interior. A color sensor receives light reflected from the target surface and generates output signals representative of a surface color. The base portion communicates with the color sensor and a user device having a hosted program which generates a user interface enabling users to provide control input for the color sensor. The program further receives the output signals from the color sensing device and displays a first image of the detected color, and displays a second image of a user-selected color beside the first image. Color data values are further displayed corresponding to the difference between displayed colors.

8 Claims, 10 Drawing Sheets

Related U.S. Application Data

(60) Provisional application No. 61/721,940, filed on Nov. 2, 2012.

(51) Int. Cl.
| | |
|---|---|
| *G06K 9/00* | (2006.01) |
| *G01J 3/46* | (2006.01) |
| *G01N 21/25* | (2006.01) |
| *H04N 9/07* | (2006.01) |
| *G01J 3/51* | (2006.01) |
| *G01J 3/02* | (2006.01) |
| *G01J 3/52* | (2006.01) |
| *H04N 5/225* | (2006.01) |
| *H04N 5/232* | (2006.01) |

(52) U.S. Cl.
CPC ........... *G01J 3/0264* (2013.01); *G01J 3/0272* (2013.01); *G01J 3/0275* (2013.01); *G01J 3/0286* (2013.01); *G01J 3/0291* (2013.01); *G01J 3/513* (2013.01); *G01J 3/524* (2013.01); *H04N 5/2252* (2013.01); *H04N 5/2254* (2013.01); *H04N 5/23293* (2013.01)

(58) Field of Classification Search
CPC .......... G01J 3/50; G01J 3/46; G01J 2003/467; G01J 3/507; H04N 1/6058; H04N 1/46; H04N 1/6077; H04N 9/67
USPC .................... 348/263, 223.1, 227.1
See application file for complete search history.

(56) References Cited

U.S. PATENT DOCUMENTS

| | | | |
|---|---|---|---|
| 5,959,529 A | 9/1999 | Kail, IV | |
| 6,014,221 A | 1/2000 | Plude, Jr. | |
| 6,157,454 A * | 12/2000 | Wagner | A61B 5/0088 356/407 |
| 6,205,244 B1 * | 3/2001 | Bawolek | G01J 3/52 348/187 |
| 6,396,416 B1 | 5/2002 | Kuusela et al. | |
| 6,553,336 B1 | 4/2003 | Johnson et al. | |
| 6,584,435 B2 | 6/2003 | Mestha et al. | |
| 6,720,887 B1 | 4/2004 | Zunti | |
| 6,798,517 B2 * | 9/2004 | Wagner | G01J 3/02 356/406 |
| 6,978,217 B2 | 12/2005 | Morozumi et al. | |
| 7,283,238 B2 * | 10/2007 | Simons | G01J 3/463 356/326 |
| 7,502,033 B1 * | 3/2009 | Axelrod | G09G 5/06 345/440 |
| 7,557,925 B2 * | 7/2009 | Nisper | G01J 3/02 356/406 |
| 7,572,028 B2 * | 8/2009 | Mueller | A45D 42/10 362/125 |
| 7,822,270 B2 * | 10/2010 | Van Hoof | H04N 1/6058 382/167 |
| 7,876,356 B2 * | 1/2011 | Xu | H04N 17/02 348/184 |
| 7,944,561 B2 | 5/2011 | Nisper et al. | |
| 8,008,613 B2 | 8/2011 | Tam | |
| 8,139,220 B2 | 3/2012 | Peterson et al. | |
| 8,237,138 B2 | 8/2012 | Nisper et al. | |
| 8,271,021 B2 | 9/2012 | Jeong | |
| 8,345,252 B2 | 1/2013 | Nisper et al. | |
| 8,415,900 B2 * | 4/2013 | Covaro | G01J 1/18 315/307 |
| 8,441,642 B2 * | 5/2013 | Wegmuller | G01J 3/02 356/420 |
| 8,788,365 B2 * | 7/2014 | Paul | G06Q 30/02 705/26.1 |
| 2002/0159066 A1 | 10/2002 | Berstis | |
| 2003/0058202 A1 * | 3/2003 | Evanicky | G09G 3/006 345/82 |
| 2003/0156283 A1 * | 8/2003 | Jung | A61C 19/04 356/326 |
| 2004/0090536 A1 * | 5/2004 | Tsai | H04N 9/735 348/223.1 |
| 2004/0266480 A1 | 12/2004 | Hjelt et al. | |
| 2005/0001986 A1 * | 1/2005 | Matsuda | G09G 3/002 353/31 |
| 2005/0018191 A1 | 1/2005 | Luo et al. | |
| 2005/0275912 A1 | 12/2005 | Chen et al. | |
| 2007/0035554 A1 | 2/2007 | McClanahan | |
| 2007/0045524 A1 * | 3/2007 | Rains, Jr. | F21S 2/00 250/228 |
| 2007/0046941 A1 * | 3/2007 | Mestha | G01J 3/02 356/402 |
| 2007/0242064 A1 * | 10/2007 | Kuo | G06F 1/1607 345/207 |
| 2008/0013077 A1 | 1/2008 | Orelli et al. | |
| 2008/0062192 A1 * | 3/2008 | Voliter | G09G 5/06 345/591 |
| 2008/0259336 A1 * | 10/2008 | Konno | A61B 5/4547 356/404 |
| 2009/0058663 A1 | 3/2009 | Joshi et al. | |
| 2009/0083459 A1 | 3/2009 | Harish | |
| 2009/0103075 A1 * | 4/2009 | Yang | G01J 3/50 356/51 |
| 2010/0127282 A1 * | 5/2010 | Harbers | F21V 9/10 257/89 |
| 2010/0128052 A1 * | 5/2010 | Keh | G03B 21/00 345/589 |
| 2010/0148083 A1 * | 6/2010 | Brown | G01J 3/02 250/372 |
| 2010/0271505 A1 * | 10/2010 | Zimmer | H04N 1/56 348/231.2 |
| 2010/0295942 A1 | 11/2010 | Jekel | |
| 2011/0050892 A1 | 3/2011 | Zind et al. | |
| 2011/0075146 A1 * | 3/2011 | Moroney | G01J 3/02 356/402 |
| 2011/0187632 A1 * | 8/2011 | Huang | G09G 3/36 345/88 |
| 2011/0201382 A1 | 8/2011 | Hsiao | |
| 2011/0215997 A1 | 9/2011 | Kim | |
| 2012/0032600 A1 * | 2/2012 | Edwards | H05B 33/0869 315/151 |
| 2012/0096380 A1 * | 4/2012 | Wagner | G06F 3/04847 715/771 |
| 2012/0129269 A1 | 5/2012 | Choi et al. | |
| 2012/0170844 A1 * | 7/2012 | Suzuki | H04N 1/6077 382/167 |
| 2012/0250020 A1 | 10/2012 | Hastings et al. | |
| 2012/0290268 A1 | 11/2012 | Bey et al. | |
| 2012/0321177 A1 * | 12/2012 | Suzuki | H04N 1/6061 382/162 |
| 2013/0042295 A1 | 2/2013 | Kelly et al. | |
| 2013/0050703 A1 | 2/2013 | Shannon et al. | |
| 2013/0113904 A1 * | 5/2013 | Wang | A61B 1/0005 348/65 |
| 2013/0207994 A1 * | 8/2013 | Rodeski | G06F 17/30899 345/594 |
| 2013/0307419 A1 * | 11/2013 | Simonian | H05B 33/0869 315/153 |
| 2014/0071177 A1 * | 3/2014 | Chu | G09G 3/2003 345/690 |

FOREIGN PATENT DOCUMENTS

| | | |
|---|---|---|
| JP | 2012065192 | 3/2012 |
| KR | 20070111671 | 11/2007 |

OTHER PUBLICATIONS

Supplementary European Search Report in corresponding European Patent Application No. EP 13 85 0063, dated Oct. 31, 2016, 11 pp.
http://spyder.datacolor.com/portfolio-view/spyder4elite/ Copy

(56) References Cited

OTHER PUBLICATIONS obtained from https://archive.org/web/ as it appeared on Apr. 7, 2012.
http://www.hitechnic.com/cgi-bin/commece.cgi?preadd=-action&key=NC01038 (available Jul. 27, 2015).
http://www.emxinc.com/industrial.html (accessed Jul. 27, 2015).
State Intellectual Property Office, P.R. China: First Office Action dated May 3, 2016 in re: Patent Application No. 201380062943.0, filed Nov. 4, 2013.

* cited by examiner

COMPUTER-IMPLEMENTED SYSTEM AND METHOD FOR COLOR SENSING, STORAGE AND COMPARISON

CROSS-REFERENCES TO RELATED APPLICATIONS

This application is a continuation under 35 U.S.C. § 111(a) of International Patent Application No. PCT/US13/68305, filed Nov. 4, 2013, which further claims the benefit of U.S. Provisional Patent Application No. 61/721,940, filed Nov. 2, 2012. The disclosures of the above references are hereby incorporated by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

An invention as set forth in the present disclosure relates generally to color sensors. More particularly, this invention relates to a device, system and method for enabling accurate wireless color sensing, storage and comparison of color information for the full range of colors in the visible spectrum.

Designers, painters, contractors, photographers, and, in general, anyone interested in looking for an accurate color information may find the current range of color measurement tools to be limited, bulky, or lacking in convenience.

It would be desirable to provide a sensor that a person can take with themselves anywhere, scan a color, obtain accurate color information, and automatically store the color information on a mobile computing device that the user will always have available (such as for example an iPhone or Android device).

BRIEF SUMMARY OF THE INVENTION

A color sensing device according to the present disclosure enables accurate wireless color sensing, storage, and comparison of color information for the full range of colors in the visible spectrum. Color information and user interface is controlled wirelessly from the sensor by a smartphone/smart device (such as an Apple iPhone, Apple iPad, or Android device) over a Bluetooth connection.

By making use of sensors and illumination separately from the user interface and color specific software, the present disclosure enables features unique to the color sense arena.

One exemplary aspect of a device and system according to the present disclosure may include a hardware design which includes a controlled, known light source and isolation from outside light.

Another exemplary aspect of the present disclosure may include the ability to control LEDs (turn off/on/various light levels) to enable measurement of color from emissive light sources, measurement of color from color samples using reflective light, and managing varying reflectivity.

Another exemplary aspect of the present disclosure may include color computation offloaded from the color sensor device, and performed remotely in the smartphone application.

Another exemplary aspect of the present disclosure may include the ability to get a color reading showing information in CIE XYZ (Tristimulus), CIE L*a*b*, RGB, and other formats as are known in the art via mathematical conversion based on a priori calibration using the MacBeth ColorChecker.

Another exemplary aspect of the present disclosure may include the ability to store thousands of color readings (meaning a user could store readings from an entire designer color sample book).

Yet another exemplary aspect of the present disclosure may include the ability to label or rename any color reading, and store color readings into customizable color collections.

Yet another exemplary aspect of the present disclosure may include the ability to get a graphical view of what a color may look like in different lighting conditions.

Still other exemplary aspects of the present disclosure may include the ability to compare a scanned color against other stored colors, or more specifically: the ability to have a visual side by side view of the color comparison and/or the ability to see CIE DeltaE measurements showing the exact color difference between two colors.

Another exemplary aspect of the present disclosure may include the ability to send color information as obtained or determined according to aspects otherwise described above via email or social media to other people (or more particularly, to devices or systems associated with other people).

Another exemplary aspect of the present disclosure may include the ability for users to fully customize their own software interface to the system as the system is provided with an open application programming interface (API).

Another exemplary aspect of the present disclosure may include the ability to verify the base module and the color sensing module are stationary for accurate measurements by using a motion sensor active within the base module, to which the color sensing module is connected.

Another exemplary aspect of the present disclosure may include the ability to accurately measure colors based on the ambient temperature. This is made possible using the base module (or host module) connected to two peripheral modules: the color sensing module and a temperature sensing module. The temperature sensing module measures ambient air temperature, while the color sensing module measures color. Color sensors are generally temperature sensitive, but by implementing a temperature sensing module, it is possible to accurately measure color in varying temperature environments.

DETAILED DESCRIPTION OF THE INVENTION

Figure 1:
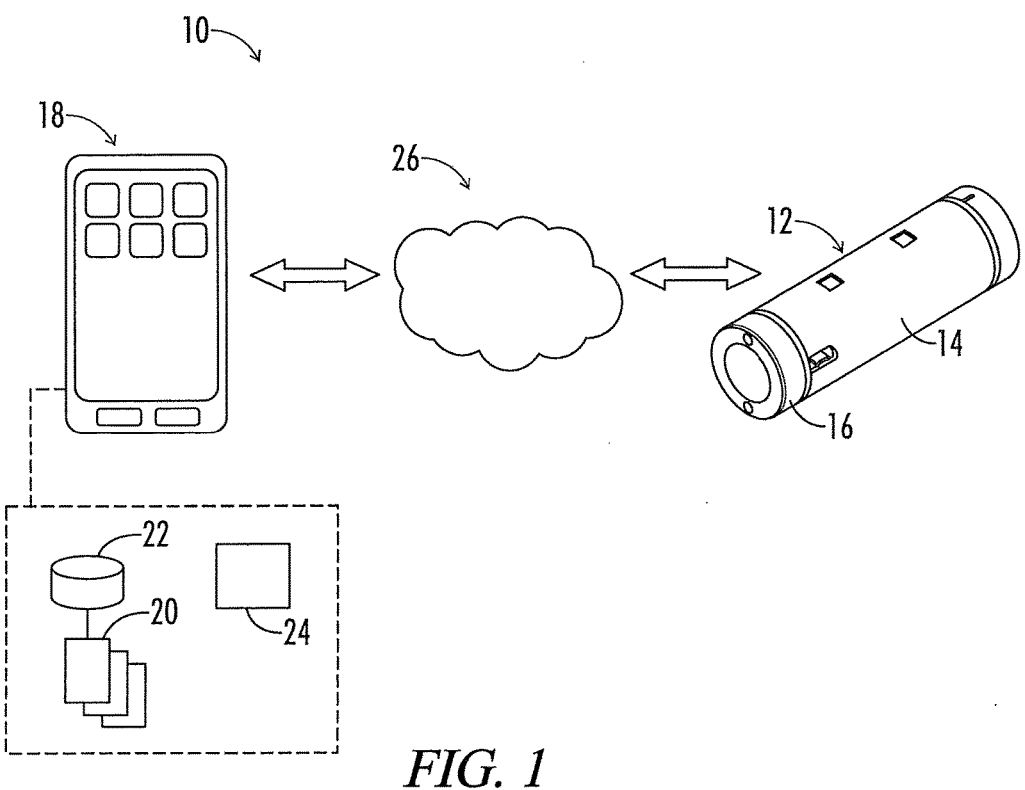
FIG. 1 is a diagram representing an exemplary color sensing system implementing a color sensing device.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring generally to FIGS. 1-7, a color sensing device, system and method according to the present disclosure may now be described in greater detail. Where the various figures may describe embodiments sharing various common elements and features with other embodiments, similar elements and features are given the same reference numerals and redundant description thereof may be omitted below.

An exemplary color sensing system 10 as represented in FIG. 1 may include without limitation a color sensing device 12 formed by a combination of a base module 14 and at least a color sensing module 16, and a computer program product 20. The program product (i.e., program instructions) may reside generally on a computer readable medium of a user computing device (e.g., typically a mobile computing device such as a smartphone or tablet computer, but also including a desktop computer, etc.) remote from the aforementioned modules or otherwise accessible by and executable from the mobile computing device. As further described below, the program product may be downloadable from a host server (not shown) to the user computing device in its entirety, or in various embodiments may be a distributed program product including one or more program modules executable from the user computing device 18 and one or more program modules executable from the host server via a communications network 26.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

A color sensing device 12 of the present disclosure may be defined by the color sensing module 16 alone or a combination of the base 14 and color sensing modules 16 via direct coupling of the color sensing module 16 to the base module 14. In an embodiment, the base module enables remote communications to and from the color sensing module with respect to the user computing device 18. The base module may further define a base, processing unit, communications interface and/or power supply for any one or more of a plurality of sensing modules that may be detachably coupled to the base module at any given time.

In one embodiment, the color-sensing module 16 may be a Chroma™ sensor module selected from a family of sensor modules offered by Variable, Inc. for use with a base module (or host module), which may be a NODE™ device also as offered by Variable, Inc.

Figure 2:
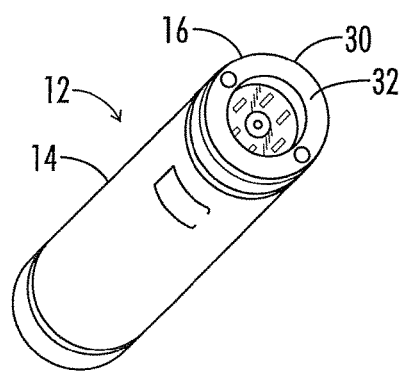
FIG. 2 is an isometric view of the exemplary color sensing device represented in FIG. 1.
Figure 3:
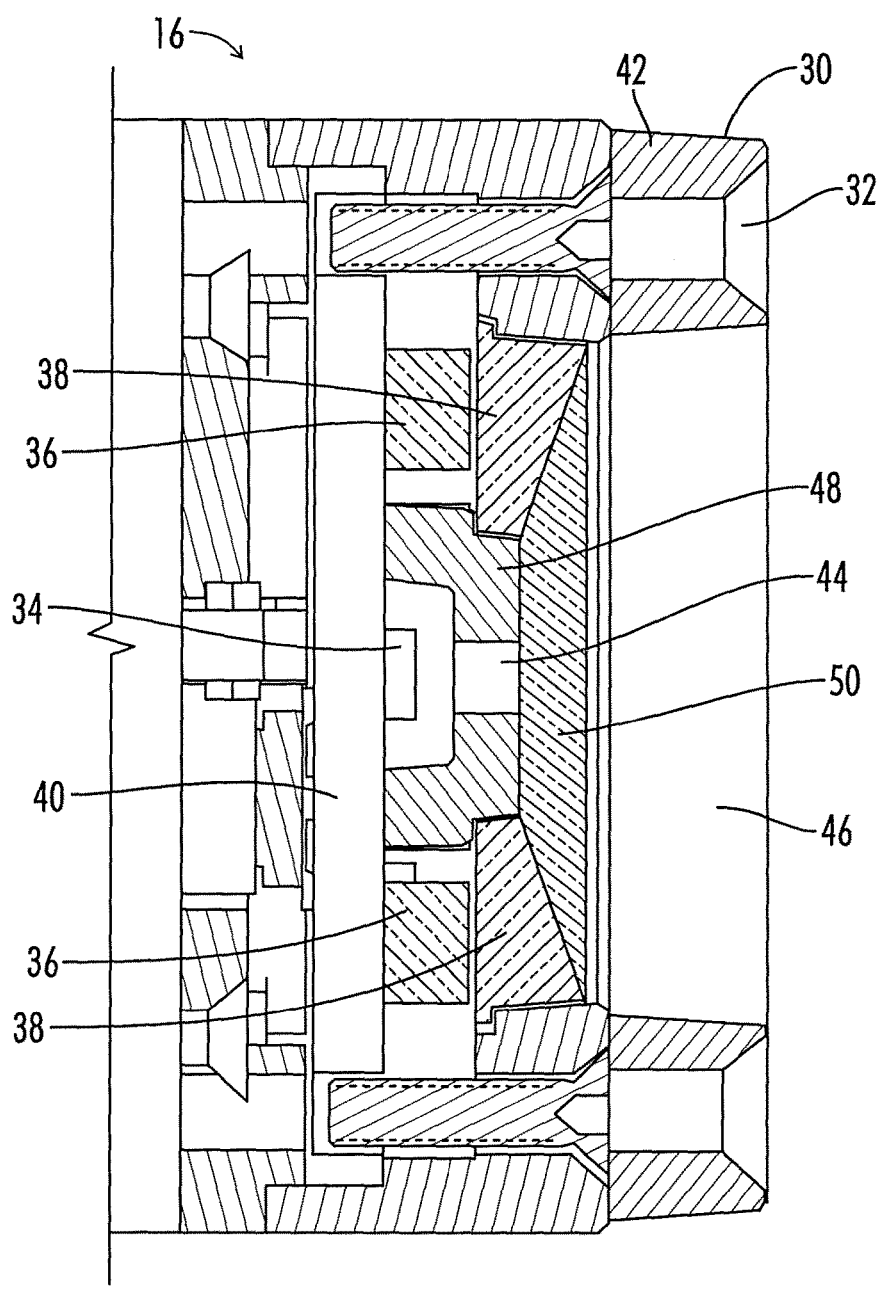
FIG. 3 is a broken interior side view of a color sensing module from the device of FIG. 1.
Figure 4:
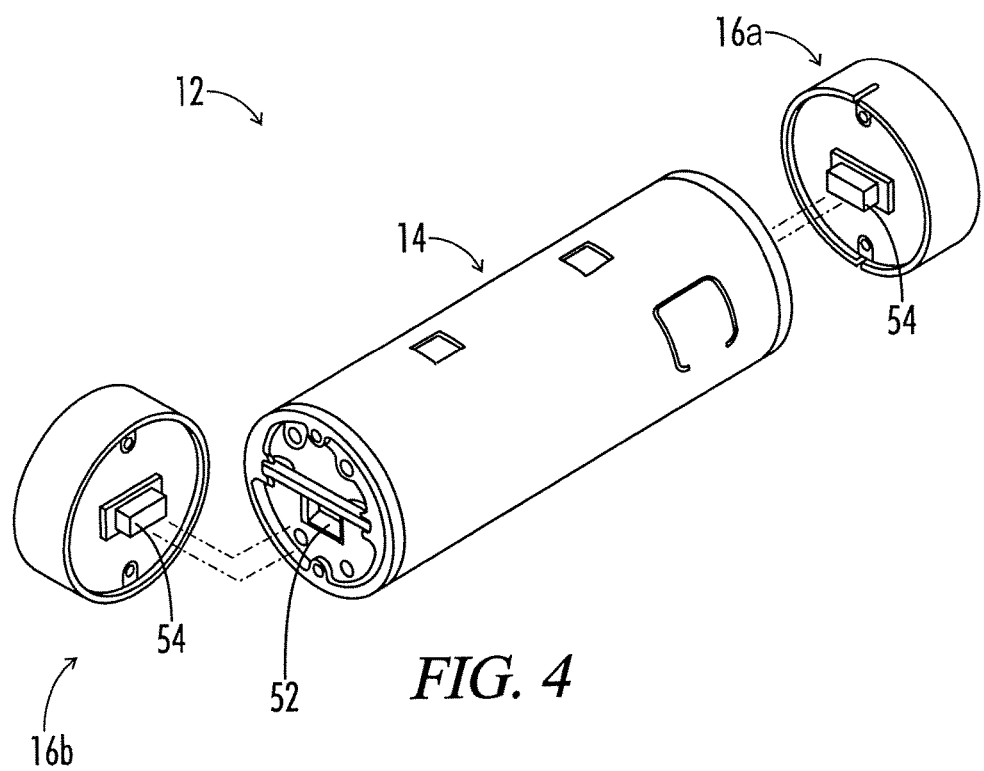
FIG. 4 is a perspective view of the exemplary color sensing device represented in FIG. 1, having first and second sensing modules detached from opposing ends of the base module.

Referring generally now to FIGS. 2-4, an example of the color-sensing module 16 includes a color sensor 34, a light source 36 for illuminating a target surface of interest and a housing 30 which may be defined in part by a face 32 shaped to engage the target surface about a perimeter of the housing 30, while the light source is offset from a plane defined by the face of the housing so as to define an interior 46 within the perimeter. When the face is disposed to engage the target surface, the housing may thereby be effective to restrict (ideally, to prevent) ambient light and otherwise enable only light radiated from the light source 36 and reflected back from the target surface of interest to be received by the color sensor 34.

The light source 36 may include a plurality of (e.g., eight) light-emitting diodes (LEDs) 36 that provide or otherwise collectively define a controlled 6500 Kelvin light source to shine on a color sample. A clear cover 38 over the LEDs may be provided in order to reduce glare and focus light on the target surface of interest. A black plastic shroud around the outside of the module may be provided to block out ambient light and prevents scratches of the colored surface of interest.

The color sensor 34 may in an embodiment comprise a color sensor chip that further includes a color sensing array of photodiodes with red, green, blue, clear, etc. The color sensor 34 may be mounted on a circuit board 40 having appropriate circuitry and/or programming in conjunction with the color sensor effective for controlling gain, prescaler, and integration time—all of which may typically be used for fine-tuning the sensor for a given environment. A rubber cover 48 with for example a 1.0 mm to 1.59 mm aperture hole 44 may be provided to further allow only reflected light from a color sample in to the color sensor array. A clear epoxy lens 50 on the rubber cover 48 may be provided in order to isolate the sensor from dust, moisture, and other external elements while still allowing light in for accurate color measurement.

In an embodiment, the color sensing module 16 further comprises a CryptoAuthentication chip or an equivalent as known in the art, which enables restricting use of the color sensing module 16 with respect to the base module 14 or any other proprietary system as desired. This chip may also further enable storage of unique calibration information for each color sensing device 12.

The color sensing module 16 may further include an electrical connector 54 enabling easy, fast interchanging of the color sensor module 16 to a corresponding connector 52 for the base module 14.

As previously noted, the base module 14 may in one embodiment be a NODE unit as offered by Variable, Inc. The base module 14 in this embodiment is an intermediate hardware component with a microprocessor and communication peripherals that handle Bluetooth communication with a user device 18 such as a smartphone or the like. As represented in FIG. 4, for example, different sensing modules, including for example Chroma, can be connected to the base module 14 and may be structurally interchangeable with each other, or in other words may be interchangeably connected to respective first and second base module connectors 52 while maintaining distinct sensing functions.

In one embodiment, the color sensing device 12 may include a color sensing module 16 and a base module 14 having associated motion sensing functionality. A color sensing method of the present disclosure may accordingly only be enabled when the base module verifies that the color sensing device is stationary and thereby assure more accurate color measurements.

In one embodiment, the color sensing device 12 may include a color sensing module 16 and an air temperature sensing module (not shown) both interchangeably connectable to either of a plurality of connection ports on the base module 14, wherein the color sensing system may have an enhanced color measurement method based further upon a sensed ambient temperature. In a particular embodiment, the temperature sensing module is a Clima device as offered by Variable, Inc. which is further effective to sense barometric pressure, ambient light, humidity, etc., representative outputs for each of which may supplement color measurements or otherwise be displayed on the user device.

The computer program product of a color sensing system 10 of the present disclosure may typically comprise computer instructions residing on a non-transitory computer-readable medium in a computing device such as for example a smart phone or tablet computer. Alternatively, the computer program product may reside in a non-transitory computer-readable medium such as a server system remote from the computing device but communicatively linked to the computing device such that execution of the computer program product directs the performance of a color sensing, storage and comparison method according to the present disclosure, at least part of which includes steps for generating a user interface on a display of the computing device and receiving user input regarding, e.g., various display parameters.

In an exemplary embodiment, the computer program product may be or include the Chroma smartphone application as provided by Variable, Inc., which enables many unique features including base module (i.e., NODE) connectivity, color sensing, color display, color comparison, color information storage, history lookup, and others as listed in the sections below. Five preliminary screenshots of program functionality are represented by reference to FIGS. 6a through 6e.

Figure 6A:
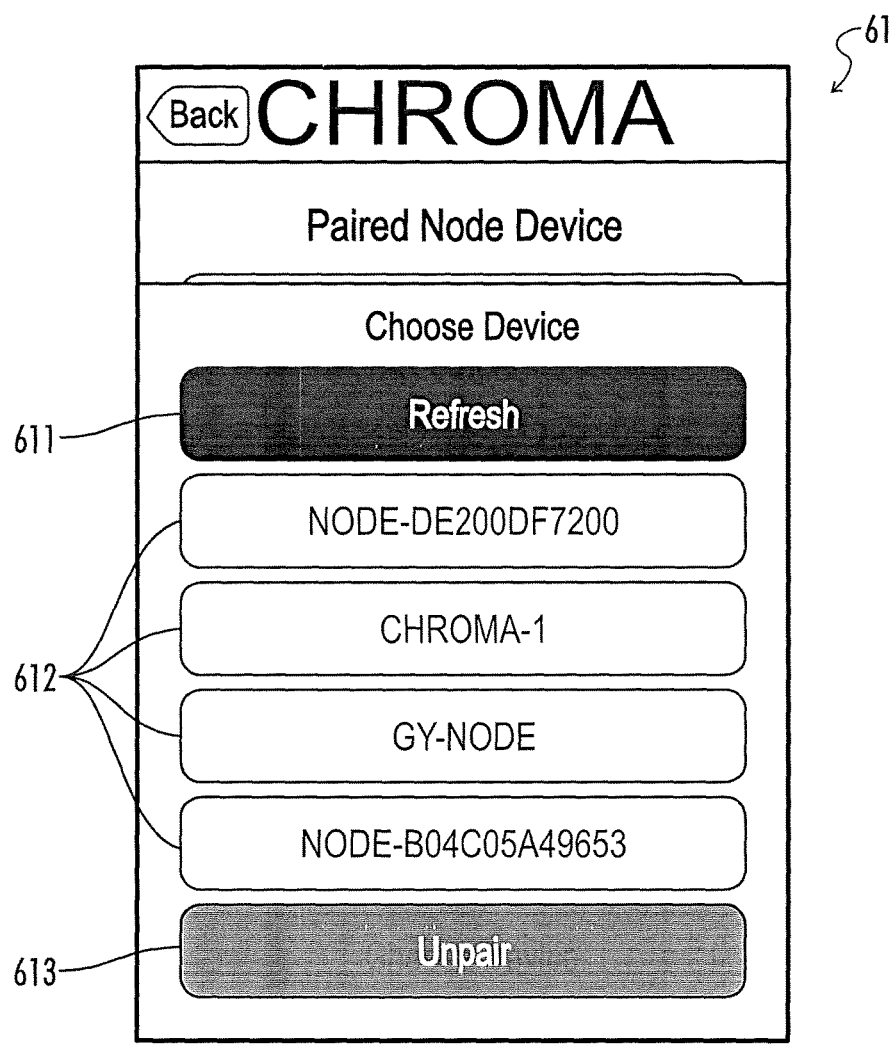
FIGS. 6*a* to 6*e* represent various user interfaces as may be generated on a display unit of a user computing device by program instructions associated with a host system according to the present disclosure.

FIG. 6a demonstrates a first exemplary user interface 61 wherein the system may identify a device according to its current functionality according to a determined "pairing" of a base module and the one or more coupled sensing modules. The interface may for example include a "Refresh" tab 611, one or more display portions identifying device pairings 612, and an "Unpair" tab 613.

Figure 6B:
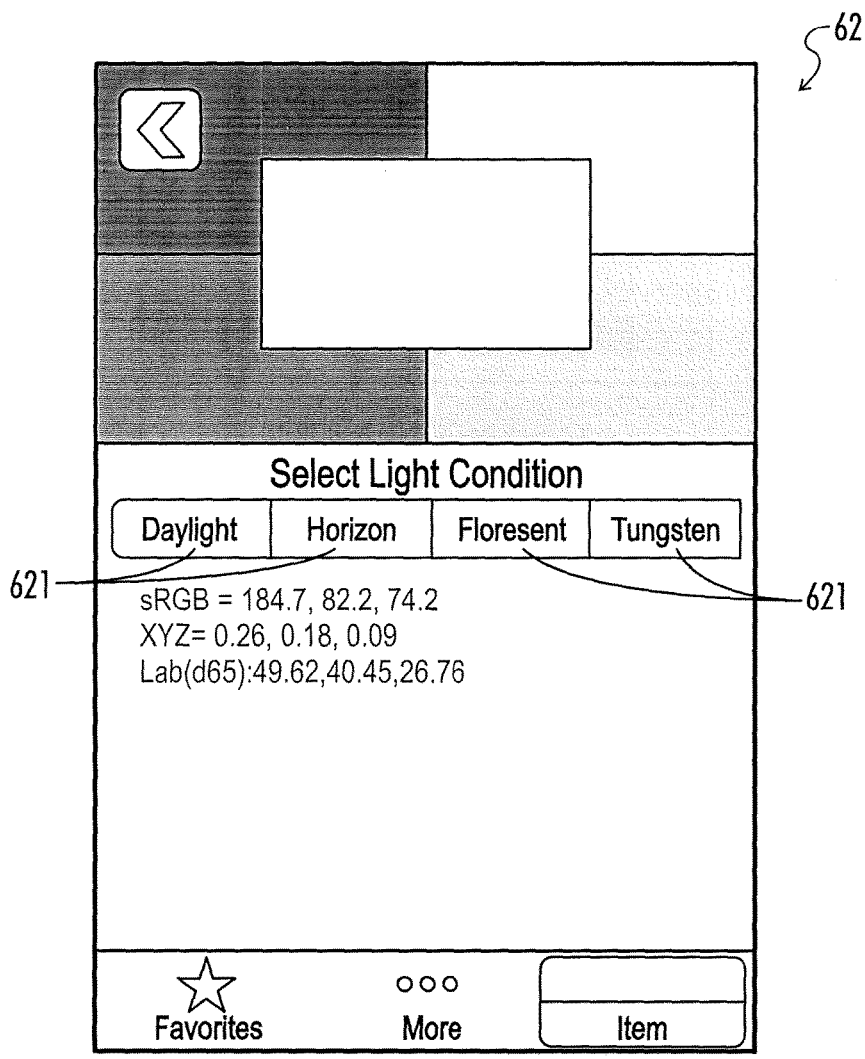

FIG. 6b demonstrates a second exemplary user interface 62 wherein a user is enabled to select tabs 621 associated with light conditions such as "Daylight", "Horizon", "Fluorescent" and "Tungsten." In accordance with the user selection, the system may direct the lighting output from the light source in the color sensing module at an associated power level.

Figure 6C:
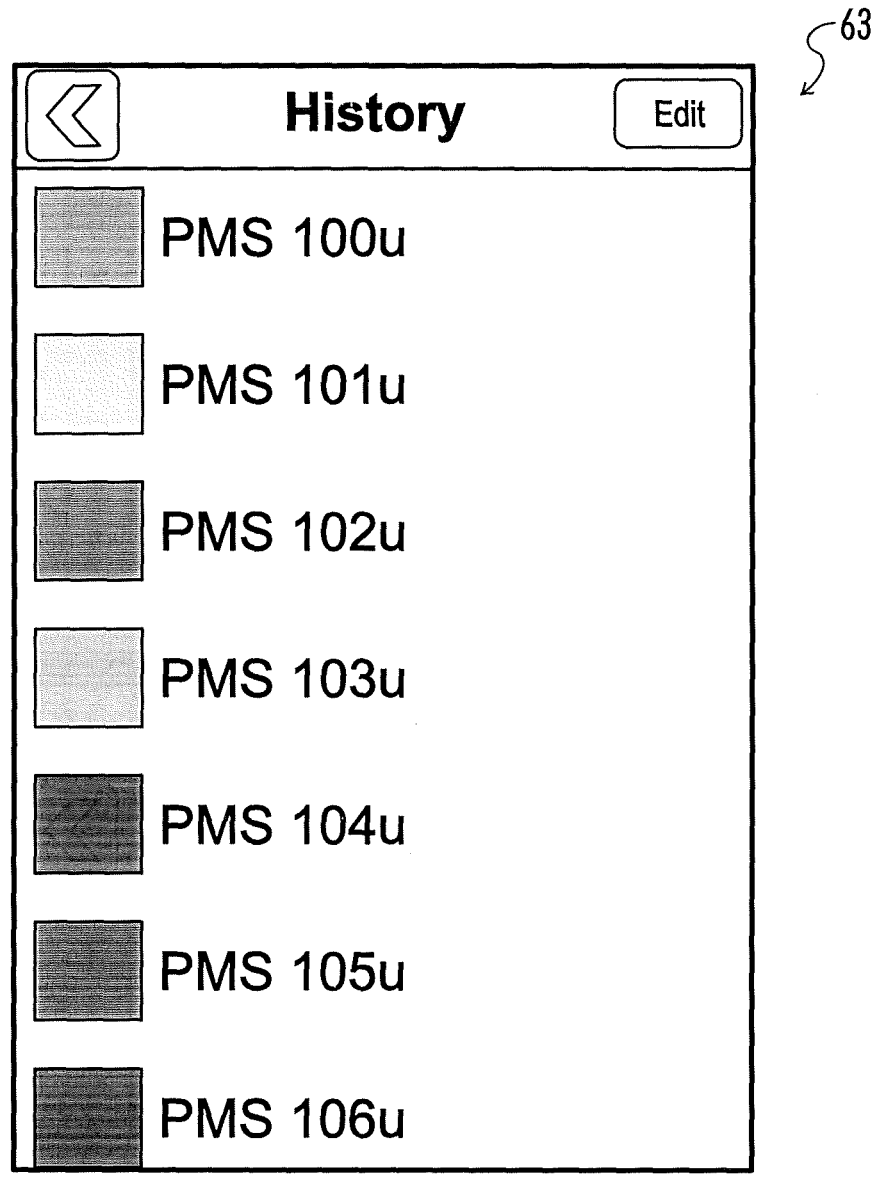

FIG. 6c demonstrates a third exemplary user interface 63 wherein a color history may be extracted from a hosted data storage network, data repository, etc., and made accessible via user selection from a displayed list including color data identifiers. The identifiers may be associated with historical results associated with the user or predefined colors and associated characteristics for appropriate comparison with current observed results.

Figure 6D:
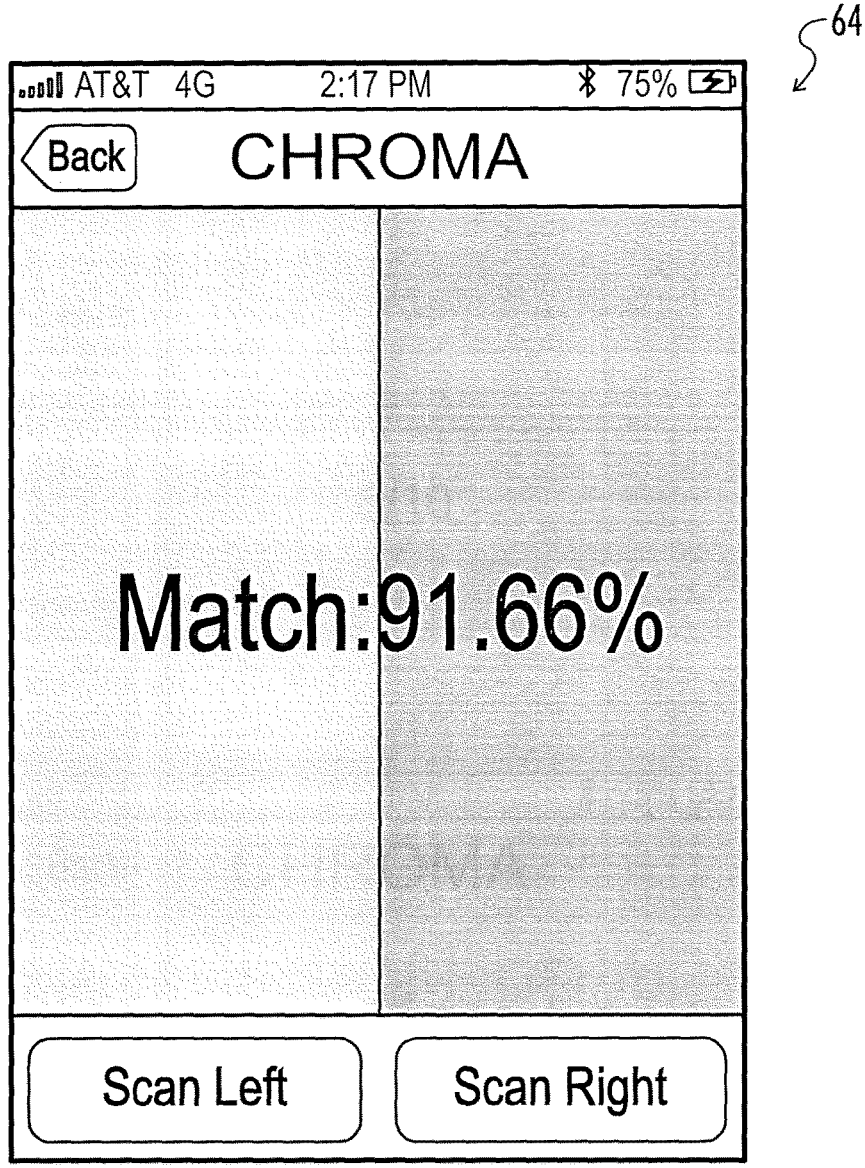

FIG. 6d demonstrates a fourth exemplary user interface 64 wherein a first color 641 (e.g., representing an observed color via the color sensing module) may be displayed alongside a second color 642 (representing a selected color, e.g., via user selection from a catalog of colors or as directly entered according to a corresponding color code or value). A value 643 representing a similarity or difference between the first and second colors 641, 642 may be generated by the system in a manner further described below and displayed.

Figure 6E:
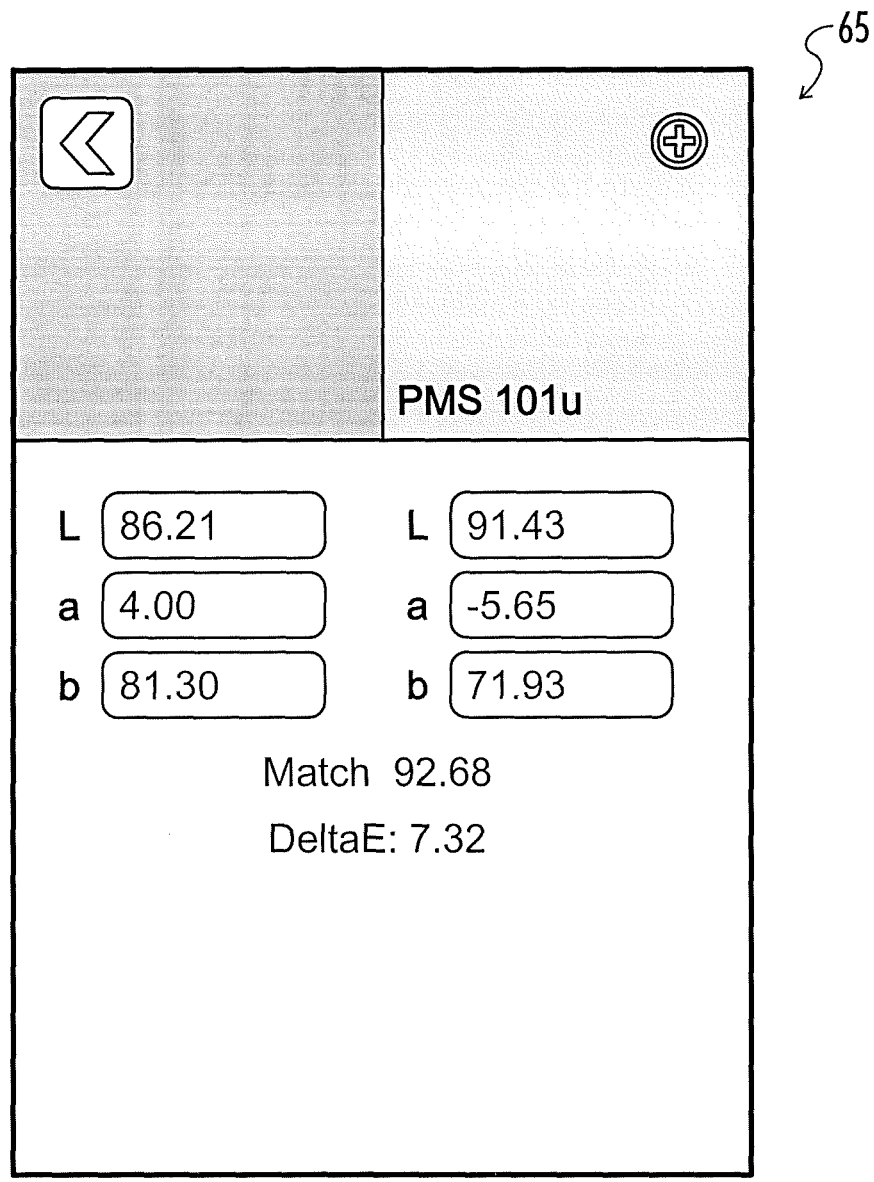

FIG. 6e demonstrates a fifth exemplary user interface 65 wherein a similarity or difference between the first and second colors may be represented with additional data in a number of forms which may in various embodiments be user-selectable.

An exemplary color sensing method according to the present disclosure may include an algorithm for sensor calibration using a priori estimation. Thanks to the linearity of the color sensing chip used in various embodiments of the present disclosure (including the Chroma color sensing module), an a priori sensor calibration algorithm 700 as represented in FIG. 7 enables the sensor to detect the tristimulus coordinates of colors with an average accuracy of 0.6%.

In accordance with one example of the method 700, known MacBeth CIE Lab values are converted to CIE XYZ Tristimulus (XYZ) values, which at this stage are all based on d50 light (step 701). Chromatic adaptation of these values is performed (step 702) by converting them to d65 reference light using a transformation method, for example a Bradford transform as is known in the art. The color sensing module of the present disclosure then generates raw red, green and blue sensor measurements (step 703) from a MacBeth ColorChecker (a color rendition chart as known in the art for use as a calibration target). The host system generates a sensor to CIE Tristimulus (XYZ) matrix (step 704) which may be used for converting future output values from the color sensor into CIE Tristimulus values a priori. For that purpose, the generated tristimulus matrix is stored to memory such as for example a CryptoAuthentication chip in the color sensing module.

Figure 7:
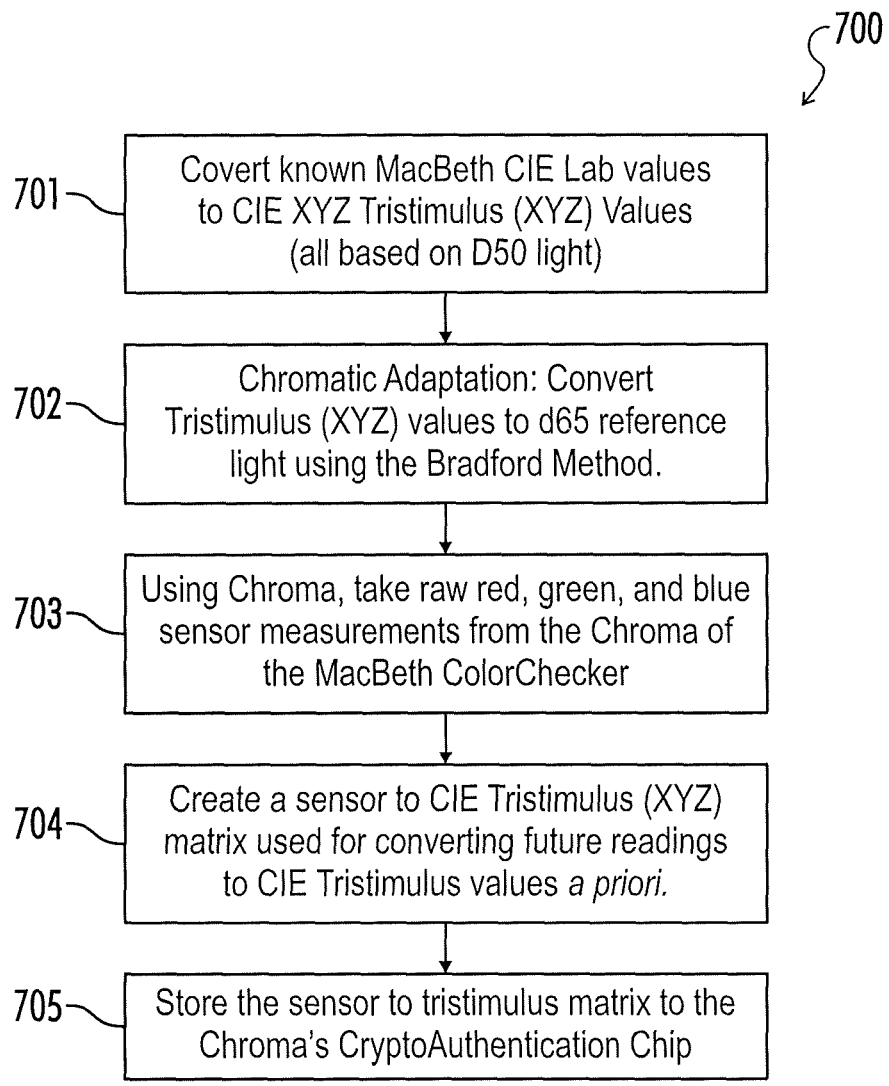
FIG. 7 is a flowchart representing an exemplary calibration method for a color sensing system according to the present disclosure.

Alternatively or in addition to the a priori estimation process as represented in FIG. 7, a color sensing calibration process may be conducted using a hosted database. Because of the consistency of Chroma's color sensing (consistent to within 0.2% sensor readings for samples it has seen before) thanks to the use of a precise sensor and an isolated environment for light, a database of known color sense values can be created (and stored on a smartphone or on a remote server and accessible via, e.g., the Internet) and compared against with high accuracy. Thanks to the large memory available on smartphones for a color sample history, this method can be used for a very large number of color samples.

Figure 5:
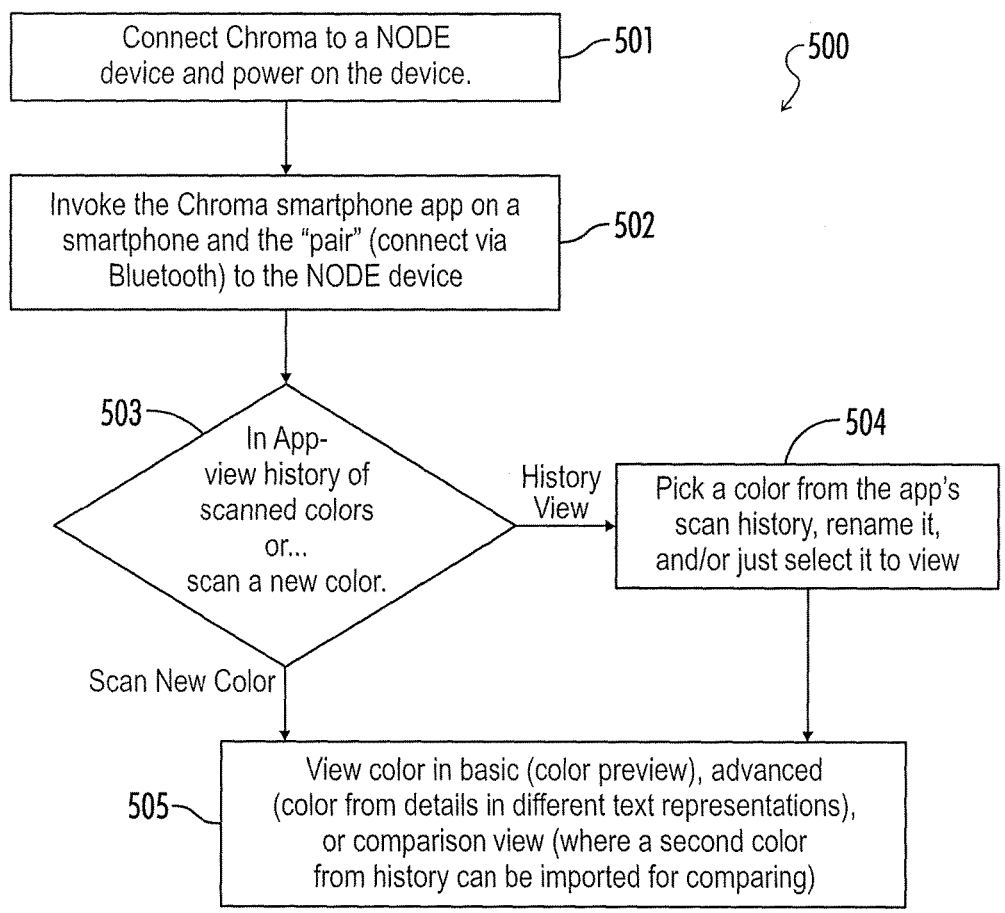
FIG. 5 is a flowchart representing an exemplary method for implementing a color sensing system according to the present disclosure.

An exemplary color measurement algorithm according to an embodiment of a color sensing method of the present disclosure may be described as follows. An operation of the computer program product residing upon or otherwise executable in association with the user's computing device is as represented in the flowchart of FIG. 5.

First, the color sensing module (for the purposes of this exemplary description, the Chroma module) is coupled to the base module (e.g., NODE) and the device is powered on (step 501). The computer program product such as the Chroma smart phone application (as executed from, e.g., an iPhone) may then be initiated by the user and subsequently "pair" (i.e., connect using for example Bluetooth technology via the communications network) with the color sensing device (step 502). The program product enables the user via a series of user interfaces to view a list of colors such as for example a history of previously scanned colors or to request a new color scan (step 503).

If the user requests a new color scan, the hosted software library on the iPhone sends a request over a communications network incorporating, e.g., Bluetooth technology and specifying the gain, prescaler, integration time, and LED (on/off/strength) settings. The base module's processor receives the Bluetooth command and sends the appropriate commands to the color sensing module. The base module may read back red, green, blue, and clear sense values from the color sensor module along with that specific color sensing module's calibrated sensor to tristimulus matrix from, e.g., the CryptoAuthentication chip. The calibration matrix and raw sense values are sent over the wireless communications network (e.g., Bluetooth) to the smartphone application, where they are mathematically converted via one or more formats known in the art including but not limited to CIE XYZ, CIE L*a*b*, sRGB values for initial display and comparison.

When the user requests a defined color view (step 504), the program product generates an appropriate interface wherein the user is enabled to select a color from for example a stored scan history, label or rename color readings or values, select individual colors for viewing, define and store personalized color collections from the color history, etc. Generally, a user may have previously downloaded and stored color values from, for example, a designer color sample book or the like as is known in the art, for the purpose of later selection and comparison against current color measurements.

As represented in step 505, colors may be viewed in their basic form (i.e., previewed) or in advanced form (colors with details in different text representations) or in a comparison view wherein a first color associated with a current scan and measurement may be displayed side-by-side with at least a second color as selected by the user from data storage, along with associated details regarding a similarity or difference between the respective colors (e.g., using CIE DeltaE measurements).

In various embodiments, the user may further select one or more of a plurality of lighting conditions, wherein the first and at least second color are displayed in accordance with the selected lighting condition, or only a first color may be displayed in accordance with a plurality of selected lighting conditions, etc.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of an invention as set forth herein, it is not intended that such references be construed as limitations upon the scope of this invention except as set forth in the following claims.

What is claimed is:

1. A color sensing system comprising:
    a color sensing device further comprising
        a housing having an external perimeter about a length thereof, and a face defining a plane perpendicular to said length,
        a substrate residing within the housing, oriented in parallel with and offset from the plane defined by the face to define an interior within the perimeter of the housing, the face configured to engage a target surface about the perimeter of the housing wherein ambient light is substantially restricted from entering the interior,
        a controlled light source and a color sensor mounted to the substrate, wherein the controlled light source comprises a plurality of light-emitting diodes circumferentially disposed about the color sensor and configured to collectively emit light having a common color temperature, a controller configured to control the plurality of light-emitting diodes to be turned off or on across a plurality of lighting power levels in response to an input control signal, the color sensor arranged to receive light radiated by the controlled light source and reflected from the target surface when the face of the color sensing device engages the target surface, the sensor further effective to generate output signals representative of a color of the target surface, and a memory storing a matrix of device-specific calibration values, wherein the controller is further effective to convert output from the color sensor to tristimulus values using a priori estimation with respect to the calibration values;

a computing device having a display unit and a computer program product residing thereon, the computer program product executable to direct the performance of operations comprising generating a user interface via the display unit enabling a user to select from a plurality of available lighting conditions for the color sensing device, transmitting control signals to the color sensing device corresponding to the selected lighting condition, receiving the output signals from the color sensing device, generating a first image comprising the color represented by said output signals on the display unit of the computing device, enabling a user to select one or more of a plurality of colors stored in a database, and generating at least a second image comprising the selected one or more colors alongside the first image.

2. The system of claim 1, wherein the matrix of device-specific calibration values is generated via a series of operations comprising:

converting known MacBeth CIE Lab values to CIE XYZ tristimulus values based on d50 light, performing chromatic adaptation of the tristimulus values using a Bradford transform, providing raw sensor calibration measurements from the color sensing device with respect to a color reference, and generating a sensor to CIE tristimulus matrix based on the tristimulus values and the raw sensor calibration measurements.

3. The system of claim 1, wherein the plurality of light-emitting diodes are configured to collectively define a controlled 6500 Kelvin light source.

4. The system of claim 1, further comprising a cover mounted to the substrate and about the color sensor, wherein the plurality of light-emitting diodes are circumferentially arranged about the cover, the cover further comprising an aperture between the color sensor and the face of the housing whereby reflected light from a color sample is passed through the cover and to the color sensor.

5. A color sensing device comprising:

a housing having an external perimeter about a length thereof, and a face defining a plane perpendicular to said length;

a substrate residing within the housing, oriented in parallel with and offset from the plane defined by the face to define an interior within the perimeter of the housing, the face configured to engage a target surface about the perimeter of the housing wherein ambient light is substantially restricted from entering the interior;

a controlled light source and a color sensor mounted to the substrate, wherein the controlled light source comprises a plurality of light-emitting diodes circumferentially disposed about the color sensor and configured to collectively emit light having a common color temperature;

a controller configured to control the plurality of light-emitting diodes to be turned off or on across a plurality of lighting power levels in response to an input control signal, the color sensor arranged to receive light radiated by the controlled light source and reflected from the target surface when the face of the color sensing device engages the target surface, the sensor further effective to generate output signals representative of a color of the target surface;

a memory storing a matrix of device-specific calibration values, wherein the controller is further effective to convert output from the color sensor to tristimulus values using a priori estimation with respect to the calibration values; and a cover mounted to the substrate and about the color sensor, wherein the plurality of light-emitting diodes are circumferentially arranged about the cover, the cover further comprising an aperture between the color sensor and the face of the housing whereby reflected light from a color sample is passed through the cover and to the color sensor.

6. The color sensing device of claim 5, wherein the matrix of device-specific calibration values is generated via a series of operations comprising:

converting known MacBeth CIE Lab values to CIE XYZ tristimulus values based on d50 light, performing chromatic adaptation of the tristimulus values using a Bradford transform, providing raw sensor calibration measurements from the color sensing device with respect to a color reference, and generating a sensor to CIE tristimulus matrix based on the tristimulus values and the raw sensor calibration measurements.

7. The color sensing device of claim 5, wherein the plurality of light-emitting diodes are configured to collectively define a controlled 6500 Kelvin light source.

8. A color sensing method comprising:

transmitting raw sensor calibration measurements with respect to a color reference from a color sensing device to a user computing device;

generating a sensor to CIE tristimulus matrix of device-specific calibration values based on the raw sensor calibration measurements;

storing the generated matrix of device-specific calibration values in memory on the color sensing device;

transmitting control signals to the color sensing device corresponding to a selected lighting condition;

controlling a light source within the color sensing device to be turned on at one of a plurality of lighting power levels as corresponding to the control signals;

receiving at a color sensor light radiated by the controlled light source and reflected from a target surface when a face of the color sensing device engages the target surface;

converting output from the color sensor to tristimulus values using a priori estimation with respect to the device-specific calibration values; and generating output signals to a display on the user computing device representative of a color of the target surface in association with the selected lighting condition.

* * * * *